May 28, 1940.   K. E. A. GÖTHBERG   2,202,792

METHOD OF MAKING CAGES FOR ROLLER BEARINGS

Filed June 11, 1937   2 Sheets-Sheet 1

INVENTOR
Karl Evald Andreas Göthberg
BY *Chas. Lyon Russell*
HIS ATTORNEY

May 28, 1940. K. E. A. GÖTHBERG 2,202,792
METHOD OF MAKING CAGES FOR ROLLER BEARINGS.
Filed June 11, 1937   2 Sheets-Sheet 2

INVENTOR
Karl Evald Andreas Göthberg
BY
HIS ATTORNEY

Patented May 28, 1940

2,202,792

UNITED STATES PATENT OFFICE 2,202,792

METHOD OF MAKING CAGES FOR ROLLER BEARINGS

Karl Evald Andreas Göthberg, Goteborg, Sweden, assignor to Aktiebolaget Svenska Kullagerfabrieken, Goteborg, Sweden, a corporation of Sweden Application June 11, 1937, Serial No. 147,623
In Germany September 18, 1936

2 Claims. (Cl. 29—148.4)

My invention relates to improvements in method of making cages for roller bearings.

Cylindrical roller bearings have hitherto generally been provided with solid roller cages, i. e. roller cages manufactured from a solid piece of metal by drilling the pockets or forming them in some other similar manner. However, such cages are rather expensive to manufacture, and consequently considerable economical advantages would be obtained, if it were possible to produce a pressed sheet metal roller cage suitable for this type of bearing and which could be made at low cost, when manufactured in large quantities. Attempts to develop such roller cages have, however, hitherto not met with any great success, since it has been found difficult to produce a form of roller cage, which is suitable for both the types of cylindrical roller bearings most commonly in use, i. e. for bearings with guiding flanges for the rollers on the outer ring and for bearings with guiding flanges for rollers on the inner ring.

An object of the invention is to obtain a suitable form of a pressed roller cage, specially adapted for cylindrical roller bearings, having considerable strength and also being easy to manufacture and assemble in the bearing. The cage is of such design that it can be used without alteration for bearings having flanges on the outer ring as well as for bearings with flanges on the inner ring.

A further advantage offered through the proposed cage is that it consists of a single piece, whereby the necessity of rivetting together several parts of the cage and the increased cost and other disadvantages consequent hereupon are avoided.

In connection with ball bearings it has previously been proposed to produce a ball cage, made in one piece, and consisting of a cylindrical portion and separating tongues located between the balls, the tongues being collapsed to form a double fold of the material between the ball pockets. In this cage the surfaces of the tongues abutting against the balls diverged inwardly and consequently the set of balls was intended to be assembled together with the inner bearing ring by partly bending the cage into form, after which the respective balls were inserted radially into the ball pockets, whereupon the bending operation on the cage was completed so that the inner bearing ring together with the set of balls formed a single unit.

By forming the ball cage in this manner, as already pointed out, it was necessary to introduce the balls radially from the outside, whereby the ball cage could not be used for bearings in which the set of balls forms a unit together with the outer bearing ring and the inner ring is separate. In other words, the cage, according to the known prior proposal, would if applied to cylindrical roller bearings be applicable only to bearings provided with guide flanges on the inner bearing ring, whereas it could not be used in bearings have flanges on the outer bearing ring. However, as a matter of fact, the known type of cage would also not be suitable for cylindrical roller bearings having guide flanges on the inner ring, for the reason that the known method assembly, which could be used with balls, cannot be used with rollers, as the roller cage would catch on the corners of the rollers when it is being bent into final shape in the course of the assembly operation.

This difficulty is avoided in the present invention by forming the cage blank in such a manner that the width of the part of the cage blank, which forms the part of the tongue of the finished cage inwardly of the connecting line between the centres of two adjacent rollers, is equal to or less than the minimum distance between the rollers, whereby this part of the roller cage can be developed inwardly past the rollers during the forming operation on the roller cage. This form of the tongues is of decisive importance for the application of the previously known type of cage to roller bearings, as well as for the possibility of making the roller cage applicable to roller bearings with flanges on the inner ring as well as for those with flanges on the outer ring. According to a special form of the invention, the cage is shaped in such a manner that the surfaces of each tongue adjacent to the rollers are substantially parallel or converge inwardly towards the centre of the bearing.

One embodiment of a roller cage according to the invention is shown in the accompanying drawings, in which.

Figure 6:
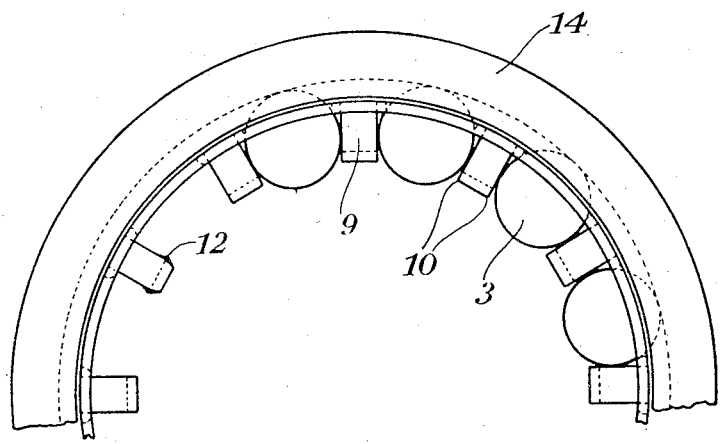

Figure 6 shows a similar view of a roller bearing with flanges on the outer ring The blank for a roller cage intended for a cylindrical roller bearing is made in the form of a cylinder, either through cutting from tubes or from a plane steel blank by means of a drawing operation. The cylindrical cage blank 1 is provided with stamped roller pockets, the middle part 2 of which is somewhat greater than the contour of the roller 3, whereas those parts 4 of the roller pockets located at the ends are somewhat narrower than the diameter of the roller.

Figure 1:
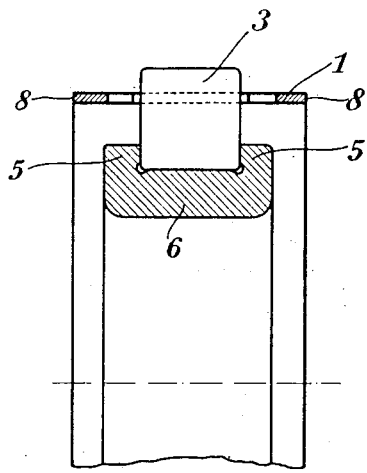
Figure 1 shows a section of a portion of the roller cage being assembled in a cylindrical roller bearing having flanges on the inner ring.
Figure 3:
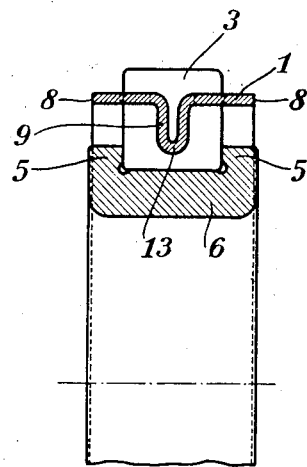
Figure 3 shows a section of a part of the bearing according to Figure 1, the roller cage having been bent to its definite form.
Figure 2:
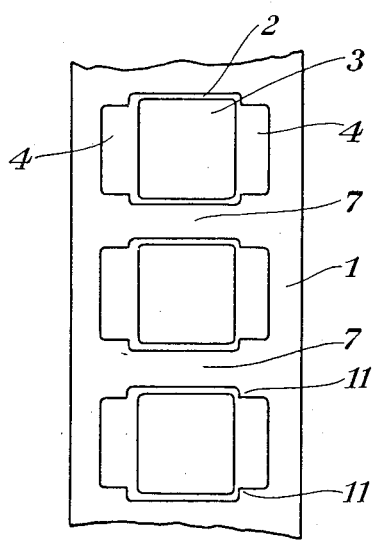
Figure 2 is a side view of the roller cage in the form as in Figure 1, developed in a plane.
Figure 4:
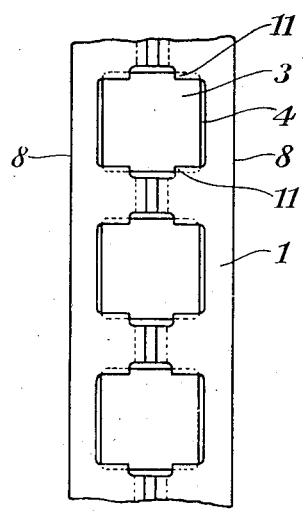
Figure 4 shows a portion of the roller cage developed in a plane.
Figure 5:
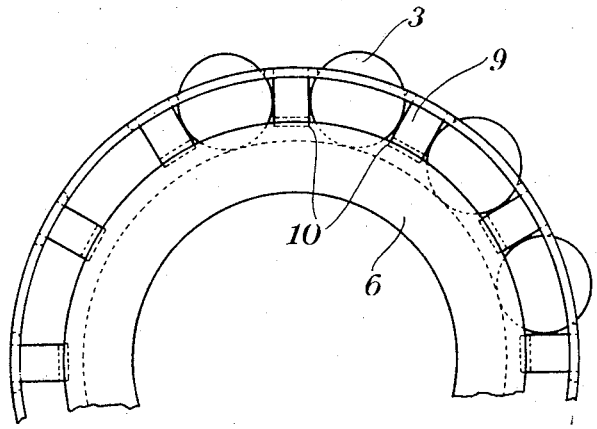
Figure 5 is a side view of a part of a roller bearing with flanges on the inner ring.

When assembling the bearing, the cage blank is first located concentrically to the bearing ring, which is provided with guide flanges for the rollers. Figures 1 and 3 show flanges 5 on the inner ring 6. The rollers are then introduced into their places by being inserted radially through the central parts 2 of the pocket openings. In the case of the bearing shown, the rollers are thus inserted from the outside, whereas in the case of a bearing with guide flanges on the outer ring, the rollers are introduced from the inside. The rollers having been located in their places, the roller cage portions 7 between the roller pockets are bent together or folded by exerting a pressure on the end surfaces 8 of the roller cage by means of a suitable tool. The roller cage can also be provided with bending indications in order to facilitate this operation.

The roller bearing now assumes the form shown in Figure 3, whereby the parts 7 of the roller cage between the roller pockets extend substantially radially inwardly towards the bearing centre, passing between the rollers past that part of the rollers, at which the rollers are nearest each other. Owing to the tongue 9 thus formed being directed along radial lines, they converge towards the centre of the bearing, and as a consequence the distance between the corners 10 at each roller pocket will be less than the diameter of the roller, and the rollers are prevented from falling inwardly out of the roller pockets when the roller cage is used in a bearing, where the inner ring can be removed, for instance in a bearing of the type shown in Figure 6 having flanges on the outer ring 14 for guiding the rollers.

During the bending operation the material is deformed at the places 13, that portion of the tongue, which is stretched in bending, becoming narrower, whereas the inner part, which is compressed, becomes broader and forms projecting cones, as shown at 12 in Figure 6. These corners are of a certain importance for retaining the rollers in the cage especially in bearings with relatively small roller diameter.

Through the bending together and folding over of the parts 7 to form the tongues 9 the roller cage has been made narrower so that the corner portions 11 at the pockets are extended over the ends of the rollers outside the pitch diameter of the roller set. The distance between these corners at each roller pocket being less than the roller diameter, the roller is prevented from falling out of the pocket in an outward direction. The roller cage and the rollers thus form a unit, which can be assembled either together with an inner ring, or with an outer ring or can also be applied separately to rings, which either are without flanges or only have a single integral flange. It is thus apparent that only a single type of cage is required for use with all the types of cylindrical roller bearings. The cage affords the further advantage of being light, permits an efficient lubrication of the bearing, is simple to manufacture and consequently inexpensive.

The invention is described above in connection with a cylindrical roller bearing, but can, of course, also be applied to other roller bearings. Thus the type of cage, according to the invention, can be applied to a conical roller bearing, whereby the primary form of the cage may conveniently be made conical. In the case of bearings, according to Figure 6, the cage can be centered on the guide flanges of the outer ring.

Having thus described my invention, I claim and desire to secure by Letters Patent:

1. The method of manufacturing and assembling roller bearings having roller cages which consists of forming a substantially cylindrical cage blank of a diameter greater than the pitch diameter of the set of rollers, forming a series of roller pockets disposed around the circumference thereof and a series of tongues therebetween of a width along their middle portions not greater than the least distance between the rollers, forming bending indications in the portions of the blank between the roller pockets, then locating the blank concentrically with respect to one of the bearing rings, then introducing the rollers into the roller pockets, and then causing the portions of the cage between the roller pockets to develope inwardly along substantially radial lines past the part of the rollers at which the rollers are nearest each other by applying pressure to the ends of the cage.

2. The method of manufacturing and assembling roller bearings having roller cages which consists in forming a substantially cylindrical cage blank of a diameter greater than the pitch diameter of the set of rollers, forming a series of roller pockets disposed around the circumference thereof and a series of tongues therebetween of a width along their middle portions not greater than the least distance between the rollers, locating the blank concentrically in respect of one of the bearing rings, then introducing the rollers into the roller pockets, and then causing the portions of the cage between the roller pockets to develope inwardly along substantially radial lines past the part of the rollers at which the rollers are nearest each other by applying pressure to the ends of the cage.

KARL EVALD ANDREAS GÖTHBERG.